United States Patent [19]
Pfeiffer

[11] Patent Number: 5,546,414
[45] Date of Patent: Aug. 13, 1996

[54] MODE-LOCKED FIBER RING LASER

[75] Inventor: Thomas Pfeiffer, Stuttgart, Germany

[73] Assignee: Alcatel N. V., Rijswijk, Netherlands

[21] Appl. No.: 483,545

[22] Filed: Jun. 7, 1995

[30] Foreign Application Priority Data

Jul. 21, 1994 [DE] Germany .................. 44 25 809.7

[51] Int. Cl.$^6$ .................................................. H01S 3/098
[52] U.S. Cl. .................. 372/18; 372/6; 372/26; 372/94; 372/703
[58] Field of Search ................... 372/18, 6, 26, 372/94, 703, 92, 98

[56] References Cited

U.S. PATENT DOCUMENTS

| | | | |
|---|---|---|---|
| 4,530,603 | 7/1985 | Shaw et al. | 385/12 |
| 5,216,681 | 6/1993 | St. Pierre et al. | 372/22 |
| 5,359,612 | 10/1994 | Dennis et al. | 372/21 |
| 5,497,386 | 3/1996 | Fontana | 372/102 |

OTHER PUBLICATIONS

"40 GHz Pulse Generation Using a Widely Tunable All-Polarisation Preserving Erbium Fibre Ring Laser", T. Pfeiffer et al, *Electronics Letters*, Oct. 14, 1993, vol. 29, No. 21, pp. 1849–1850.

"Dual Wavelength Pulse Gneeration Using Mode–Locked Erbium–Doped Fibre Ring Laser", J. Schlager et al, *Electronics Letters*, Oct. 24, 1991, vol. 27, No. 22, pp. 2072–2073.

"High–Speed III–V Semiconductor Intensity Modulators", R. Walker, *IEEE Journal of Quantum Electronics*, vol. 27, No. 3, Mar. 1991, pp. 654–667.

*Primary Examiner*—Leon Scott, Jr.
*Attorney, Agent, or Firm*—Ware, Fressola, Van Der Sluys & Adolphson

[57] ABSTRACT

A passively mode-locked fiber ring laser (LAS) is disclosed for generating optical pulses whose repetition frequency is settable. The mode-locked fiber ring laser (LAS) contains an erbium-doped fiber (ER), a ring resonator (RES), a pump-light source (PUMP), an optical modulator (MOD), and a feedback loop (RS). A portion of the signal light, which is produced by stimulated emission and is composed of a plurality of pulse repetition frequencies, is processed in the feedback loop (RS) into a drive signal which is coupled to the control input of the optical modulator (MOD). The feedback loop (RS) includes an adjustable filter which filters the desired pulse repetition frequency from the signal light. Thus, optical pulses of a given repetition frequency are developed in the ring resonator (RES) and at the output (OUT) of the passively mode-locked fiber ring laser (LAS).

12 Claims, 2 Drawing Sheets

MODE-LOCKED FIBER RING LASER

TECHNICAL FIELD

The present invention relates to a mode-locked fiber ring laser for generating optical pulses.

BACKGROUND OF THE INVENTION

In an article by Th. Pfeiffer and G. Veith, "40 GHz pulse generation using a widely tunable all-polarization preserving erbium fibre ring laser", Electronic Letters, October 1993, pp. 1849–1850, an actively mode-locked fiber ring laser for generating optical pulses is described. The fiber ring laser contains an erbium-doped fiber, a pump-light source, an optical isolator, an optical filter, and a Mach-Zehnder modulator. To generate the optical pulses, the Mach-Zehnder modulator is driven by an AC voltage source. When a voltage is applied to the Mach-Zehnder modulator, the refractive index in the Mach-Zehnder arms will change briefly, so that interference phenomena will result in the signal light being amplitude-modulated. If the voltage is an alternating voltage, optical pulses will thus be developed at the output of the fiber ring laser. The AC voltage source operates in the GHz range and must be adjusted very accurately to the round-trip frequency of the light in the ring resonator. In addition, operation at high voltages is necessary, which requires the use of electrical high-frequency amplifiers.

DISCLOSURE OF INVENTION

It is, therefore, the object of the invention to provide a technically simpler mode-locked fiber ring laser for generating optical pulses. According to the invention, a mode-locked fiber ring laser for generating optical pulses comprises an active laser medium, a ring resonator, a pump-light source, and optical modulator, and a coupling device for coupling out signal light, wherein the optical modulator can be operated by a driving signal, and wherein the driving signal can be derived from a portion of the signal light via a feedback loop.

In further accord with the invention, the feedback loop can include an optical or electrical filter.

In still further accord with the invention, the pulse repetition frequency which can be filtered out by the filter is settable.

According still further to the invention, the optical modulator is operable by an electric driving signal, and wherein the feedback loop includes an optical-to-electrical transducer.

In accordance still further with the invention, the electric driving signal is a direct voltage.

Further in accord with the invention, the ring resonator includes an optical filter.

Still further in accord with the invention, the active laser medium is a fiber doped with a rare-earth element.

According still further to the invention, the fibers used are polarization-preserving single-mode fibers.

In still further accord with the invention, the ring resonator includes one or more optical isolators. A particular advantage of the invention lies in the high stability of the repetition frequency of the optical pulses, which is achieved by the use of feedback and passive components.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
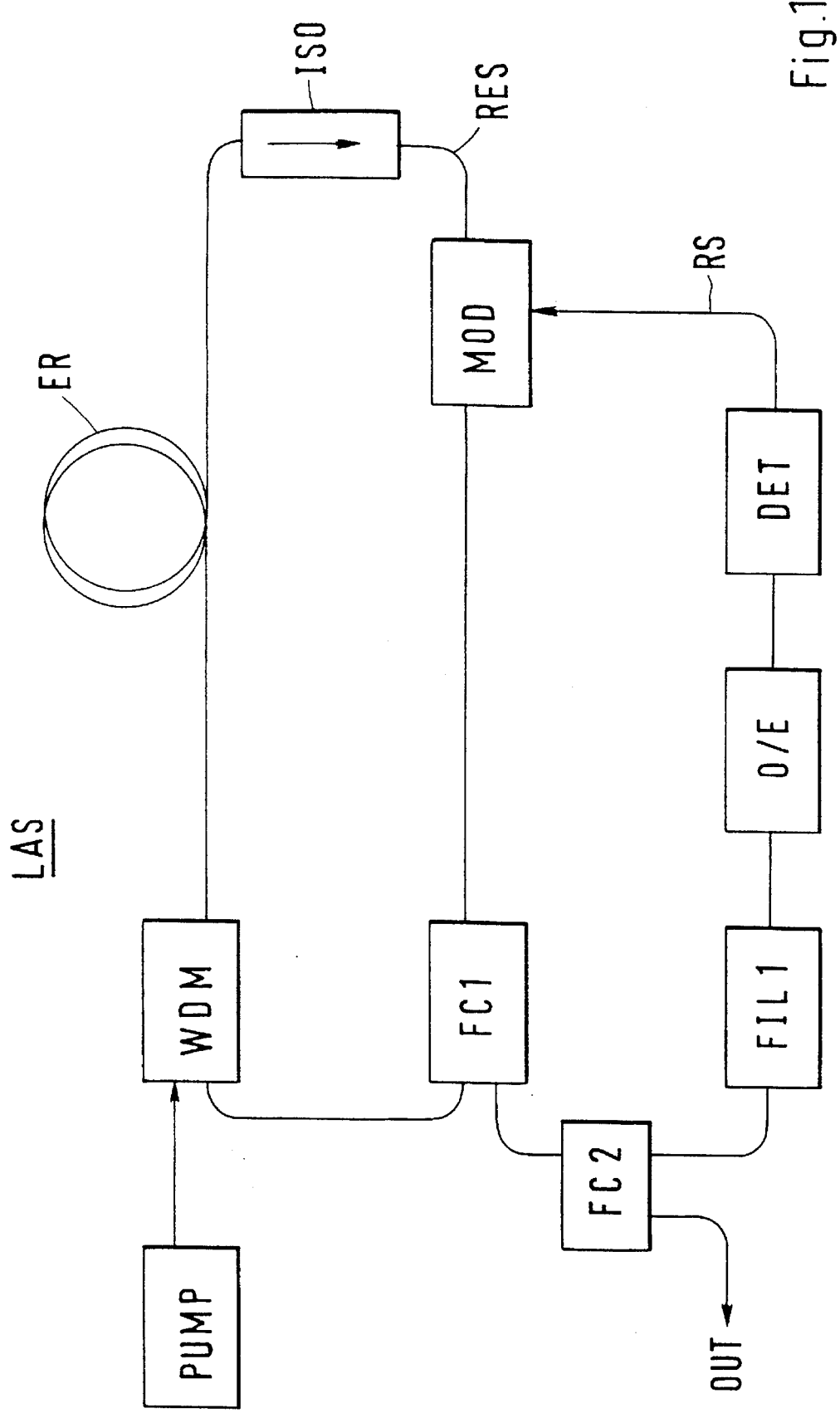
FIG. 1 is a schematic diagram of an embodiment of a mode-locked fiber ring laser according to the invention incorporating an optical filter.

Two embodiments of the invention will now be described with reference to FIGS. 1 and 2. FIG. 1 shows a passively mode-locked fiber ring laser according to the invention incorporating an optical filter. The passively mode-locked fiber ring laser LAS comprises an erbium-doped fiber ER as an active laser medium, a fiber resonator, a pump-light source PUMP, and an optical modulator MOD for generating the optical pulses. The fiber ring laser LAS further includes an optical isolator ISO, a wavelength-dependent coupler WDM, two asymmetrical fiber couplers FC1, FC2, an optical filter FIL1, an optical-to-electrical transducer O/E, and a detector DET.

The fiber resonator is designed as a ring resonator RES. In the ring resonator RES, the erbium-doped fiber ER, the optical isolator ISO, the optical modulator MOD, the first asymmetrical fiber coupler FC1, and the wavelength-dependent coupler WDM are connected in series.

The wavelength-dependent coupler WDM has three ports. Two ports serve to connect the coupler into the ring resonator RES. The third port is connected to the pump-light source PUMP. The pump-light source PUMP generates pump light which is coupled through the wavelength-dependent coupler WDM into the ring resonator RES. The pump light has a shorter wavelength than the signal light.

The optical isolator ISO transmits light with negligible loss in only one direction; in the other direction, the light is attenuated by more than 30 dB. The optical isolator ISO serves, inter alia, to fix the direction of circulation of the signal light. It has two ports and is so connected into the ring resonator RES that its direction of transmission is equal to the desired direction of propagation of the signal light. In the embodiment, the signal light propagates clockwise.

The first asymmetrical fiber coupler FC1 has three ports. Two ports serve to connect the coupler into the ring resonator RES. The third port forms the port for a feedback loop RS. At the third port, signal light is coupled asymmetrically from the ring resonator RES. For example, 20% of the signal light is coupled from the ring resonator RES and is available at the port for the feedback loop RS, while the other 80% of the signal light remain in the ring resonator RES and maintain the operation of the passively mode-locked fiber ring laser LAS.

The optical modulator MOD has three ports, two optical ones and an electrical one. The two optical ports serve to connect the modulator into the ring resonator RES, and the electrical port receives a driving signal. The optical modulator MOD is, for example, a Mach-Zehnder modulator as is described, for example, in IEEE Journal of Quantum Electronics, Vol. 27, No. 3, March 1991, pp. 654–667. By applying a voltage at the electrical port, the refractive index in the Mach-Zehnder arms can be changed and, consequently, the signal light in the ring resonator RES can be amplitude-modulated. The optical modulator MOD is driven via the feedback loop RS, which couples an electric driving signal derived from a portion of the signal light into the electrical port of the optical modulator MOD. The feedback loop RS contains the second asymmetrical fiber coupler FC2, the optical filter FIL1, the optical-to-electrical transducer O/E, and the detector DET.

The second asymmetrical fiber coupler FC2 has three ports. Two ports serve to connect the coupler into the feedback loop RS. The third port forms the output OUT of the mode-locked fiber ring laser LAS.

The optical filter FIL1 is a Fabry-Perot filter, for example. It serves to filter the desired pulse repetition frequency from light having a plurality of pulse repetition frequencies, i.e., from light which consists of a combination of a plurality of pulse repetition frequencies.

The optical-to-electrical transducer O/E contains a photodiode, for example. It converts an optical input signal to an electric output signal.

The detector DET is a level detector, for example. The level, i.e., the amplitude, of an AC input voltage signal is determined and is processed into a DC output voltage signal, which serves to drive the optical modulator MOD. In addition, signal adaptation to the modulation range of the optical modulator MOD is performed.

After turn-on of the passively mode-locked fiber ring laser LAS, i.e., after turn-on of the pump-light source PUMP, signal light having a plurality of pulse repetition frequencies is produced in the ring resonator RES by stimulated emission in the erbium-doped fiber ER. The signal light thus has a plurality of components with different pulse repetition frequencies. A fixed DC voltage, the bias $U_v$, is applied to the optical modulator MOD. The resulting pulse repetition frequencies are integral multiples of the round-trip frequency f of the light in the ring resonator RES. The round-trip frequency f is given by $f=c/(L \cdot n)$, where c=velocity of light in vacuo, L=resonator length, and n=refractive index. With L=30 m and n=1.5, for example, a round-trip frequency of f=6.67 MHz is obtained. With a Mach-Zehnder modulator used as the optical modulator MOD, the dependence of the transmission T on the drive voltage U is given by:

$$T \sim \cos^2\left(\frac{U}{U_\pi} \cdot \frac{\pi}{2}\right),$$

where $U_{90}$ is a fixed voltage. By applying a fixed bias $U_v$ in the range $0<U_v<U_\pi$, the optical modulator MOD is caused to operate as an attenuator, so that the mode-locked fiber ring laser LAS operates in a throttled mode. A portion of the signal light is fed via the asymmetrical fiber couplers FC1, FC2 to the optical filter FIL1. The optical filter FIL1 filters the light component with the desired pulse repetition frequency from the portion of the signal light, and feeds the optical signal thus obtained to the optical-to-electric transducer O/E. The optical-to-electrical transducer O/E converts the optical signal to an electric signal, which is applied to the detector DET. The amplitude of the electric signal determines the detector output voltage, which represents the drive voltage U for the optical modulator MOD. With no electric signal applied to the detector DET, the drive voltage U will have the value of the bias voltage $U_v$. If the electric signal applied to the detector has the maximum amplitude, the drive voltage U will be zero, i.e., the transmission T will have a value of 1 and the optical modulator MOD will function only as a through-connection element. Accordingly, the range of values of the drive voltage U is given by $0 \leq U \leq U_v$. Through the action of the feedback loop RS, signal light with exclusively the desired pulse repetition frequency is produced in the ring resonator RES. On an average, the amplitude of the light components produced is nearly constant. Due to a statistical distribution, short-time states result in which the amplitude of individual light components is higher than the amplitude of the remaining light components. If the state occurs in which the amplitude of the light component with the desired pulse repetition frequency is high compared with the amplitude of the remaining light components, the transmission T in the optical modulator MOD will be increased via the feedback loop RS. The increased transmission T results in a further rise of the amplitude of the light component with desired pulse repetition frequency, which, in turn, leads to an increased transmission T. A stable state is reached when the transmission value T is 1 and exclusively optical pulses having the desired pulse repetition frequency circulate in the ring resonator RES. With an adjustable optical filter FIL1, the mode-locked fiber ring laser LAS can thus be used to generate optical pulses whose repetition frequency is conditionally settable. The conditional settability of the pulse repetition frequency results from the fact that the pulse repetition frequency must be equal to an integral multiple of the round-trip frequency f of the light in the ring resonator RES.

Figure 2:
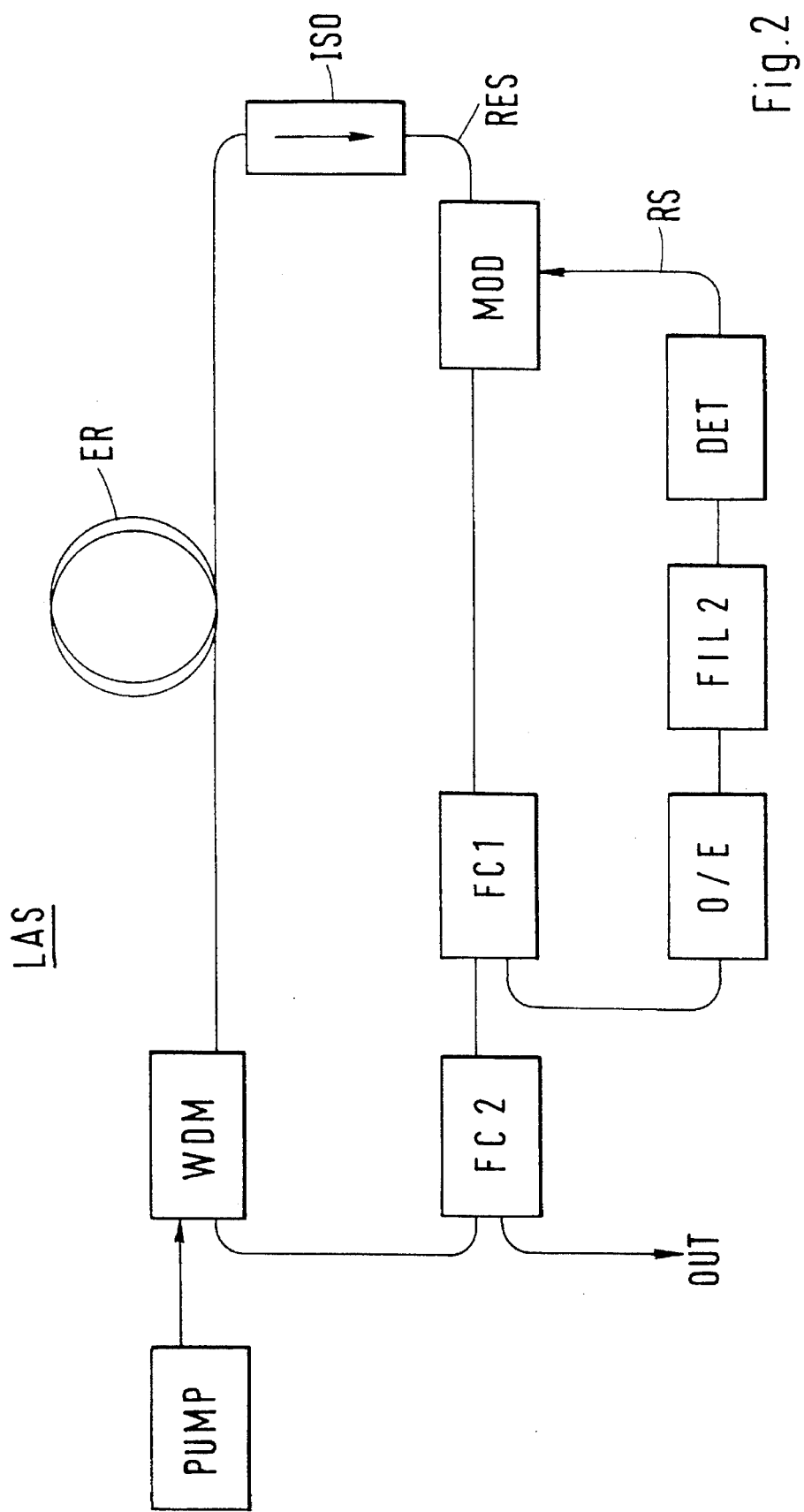
FIG. 2 is a schematic diagram of an embodiment of a mode-locked fiber ring laser according to the invention incorporating an electrical filter.

FIG. 2 shows a passively mode-locked fiber ring laser according to the invention which incorporates an electrical filter. The passively mode-locked fiber ring laser LAS, like the laser described with reference to FIG. 1, is a fiber ring laser with a feedback loop. Except for the location of the second fiber coupler FC2 and the order of the elements of the feedback loop RS, the passively mode-locked fiber ring laser LAS and the laser described with reference to FIG. 1 are identical. The feedback loop RS contains an optical-to-electrical transducer O/E, an electrical filter FIL2, and a detector DET. The second fiber coupler FC2, which provides the output OUT of the mode-locked fiber ring laser LAS is contained in the ring resonator RES, not in the feedback loop RS (as is the case in the laser described with reference to FIG. 1).

The electrical filter FIL2 is a bandpass filter, for example. It serves to filter the desired pulse repetition frequency from an electric signal.

After turn-on of the passively mode-locked fiber ring laser LAS, signal light having a plurality of pulse repetition frequencies is produced in the ring resonator RES by stimulated emission in the erbium-doped fiber. The light signal has a plurality of components with different pulse repetition frequencies. A fixed bias voltage $U_v$ is applied to the optical modulator MOD (Mach-Zehnder modulator). A portion of the signal light is fed via the asymmetrical fiber coupler FC1 into the optical-to-electrical transducer O/E. The optical-to-electrical transducer O/E converts the optical signal to an electric signal, which is applied to the electrical filter FIL2. The electrical filter filters a pulse repetition frequency from the electric signal, which consists of a combination of a plurality of pulse repetition frequencies, and applies the AC voltage signal thus obtained to the detector. The amplitude of the AC voltage signal determines the detector output voltage, which represents the drive voltage U for the optical modulator MOD. With no electric signal applied to the detector DET, the drive voltage U will have the value of the bias voltage $U_v$. If the electric signal applied to the detector has the maximum amplitude, the drive voltage U will be zero, i.e., the transmission T will have a value of 1 and the optical modulator MOD will function only as a through-connection element. Accordingly, the range of values of the drive voltage U is given by $0 \leq U \leq U_v$. Through the action of the feedback loop RS, signal light with exclusively the desired repetition frequency is produced in the ring resonator RES. On an average, the amplitude of the light components produced is nearly constant. Due to a statistical distribution, short-time states result in which the amplitude of individual light components is higher than the amplitude of the remaining light components. If the state occurs in which the amplitude of the light component with the desired pulse repetition frequency is high compared with the amplitude of the remaining light components, the transmission T in the optical modulator MOD will be increased via the feedback loop RS. The increased transmission T results in a further rise of the amplitude of the light component with the desired pulse repetition frequency, which, in turn, leads to an increased transmission T. A stable state is reached when the transmission value T is 1 and exclusively optical pulses having the desired pulse repetition frequency circulate in the ring resonator RES. With an adjustable electrical filter FIL2, the passively mode-locked fiber ring laser LAS can thus be used to generate optical pulses whose repetition frequency is conditionally settable. The conditional settability of the pulse repetition frequency results from the fact that the pulse repetition frequency must be equal to an integral multiple of the round-trip frequency f of the light in the ring resonator RES.

In the embodiments, the fibers used are preferably polarization-preserving single-mode fibers for reasons of stability. The polarization-preserving single-mode fibers prevent any interference phenomena caused by polarization, which might degrade the performance of the mode-locked fiber ring laser LAS.

In both embodiments, to stabilize the passively mode-locked fiber ring laser LAS, an optical filter can advantageously be inserted into the resonator circuit, e.g., between the optical isolator ISO and the optical modulator MOD. This optical filter should have a wide bandwidth and transmit signal light in a window with a width of, e.g., 2–3 nm. Thus, the optical filter could transmit signal light with a wavelength of 1530 nm+/−1.5 nm, for example.

In the first embodiment, the level detector in the detector DET can be dispensed with if the optical-to-electrical transducer O/E is a "slow" photodiode, i.e., a photodiode which responds to a frequency far below the pulse repetition frequency. In this manner, the level measurement is already performed by the photodiode. Then the output of the photodiode only needs to be adapted to the modulation range of the optical modulator MOD.

In the embodiments, a passively mode-locked fiber ring laser LAS is described in which the active laser medium is an erbium-doped fiber ER. Instead of the erbium-doped fiber, a fiber ER doped with another rare-earth element can be used.

Furthermore, only those parts and units of the passively mode-locked fiber ring laser LAS are mentioned in the embodiments which are thought necessary for an understanding of the invention. Further parts and units, such as additional optical isolators, polarizers, optical filters, optical attenuators, or synchronizers, whose use, arrangement, advantages, or even necessity are familiar to those skilled in the art, e.g., from Electronic Letters, Oct. 24, 1991, Vol. 27, No. 22, have not been described.

Similarly, although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A mode-locked fiber ring laser for generating optical pulses having a repetition frequency, comprising:
   a pump-light source;
   a ring resonator connected to the pump-light source, said ring resonator having components connected in series including an active laser medium, an optical modulator, and a coupling device for coupling out signal light;
   a feedback loop for receiving a portion of the signal light and for deriving a driving signal from the portion of the signal light via the feedback loop; and
   wherein the driving signal is applied via the feedback loop to the optical modulator for modulating the signal light in the ring resonator at a desired pulse repetition frequency to thereby provide stability of the repetition frequency of the optical pulses.

2. A mode-locked fiber ring laser as claimed in claim 1, wherein the feedback loop includes an optical filter for filtering the desired pulse repetition frequency from the portion of the signal light.

3. A mode-locked fiber ring laser as claimed in claim 2, wherein the pulse repetition frequency which is filtered out by the filter is settable.

4. A mode-locked fiber ring laser as claimed in claim 2, wherein the optical modulator is responsive to an electric driving signal for modulating the signal light in the ring resonator at the desired pulse repetition frequency, and wherein the feedback loop includes an optical-to-electrical transducer for deriving the electric driving signal from the output of the optical filter.

5. A mode-locked fiber ring laser as claimed in claim 1, wherein the feedback loop includes an electrical filter for filtering the desired pulse repetition frequency from an electrical signal derived from the portion of the signal light.

6. A mode-locked fiber ring laser as claimed in claim 5, wherein the pulse repetition frequency which is filtered out by the filter is settable.

7. A mode-locked fiber ring laser as claimed in claim 1, wherein the optical modulator is responsive to an electric driving signal for modulating the signal light in the ring resonator at the desired pulse repetition frequency, and wherein the feedback loop includes an optical-to-electrical transducer for deriving the electric driving signal from the portion of the signal light.

8. A mode-locked fiber ring laser as claimed in claim 7, wherein the electric driving signal is a direct voltage.

9. A mode-locked fiber ring laser as claimed in claim 1, wherein the active laser medium is a fiber doped with a rare-earth element.

10. A mode-locked fiber ring laser as claimed in claim 1, further including optical fibers for interconnecting the components of the fiber ring laser, and wherein the optical fibers used are polarization-preserving single-mode fibers.

11. A mode-locked fiber ring laser as claimed in claim 1, wherein the ring resonator further includes one or more optical isolators.

12. A mode-locked fiber ring laser as claimed in claim 1, wherein the feedback loop includes:
   an optical-to-electrical transducer for deriving an electrical signal from the portion of the signal light;
   an electrical filter for providing an electric driving signal by filtering the desired pulse repetition frequency from the electrical signal; and
   wherein the optical modulator is responsive to the electric driving signal for modulating the signal light in the ring resonator at the desired pulse repetition frequency.

* * * * *